United States Patent
Itaya

(10) Patent No.: US 10,345,842 B2
(45) Date of Patent: Jul. 9, 2019

(54) POWER-DISTRIBUTION-SYSTEM VOLTAGE CONTROL SYSTEM, POWER-DISTRIBUTION-SYSTEM VOLTAGE CONTROL METHOD, AND CENTRALIZED VOLTAGE CONTROL APPARATUS

(75) Inventor: Nobuhiko Itaya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 577 days.

(21) Appl. No.: 14/354,610

(22) PCT Filed: Oct. 31, 2011

(86) PCT No.: PCT/JP2011/075107
§ 371 (c)(1),
(2), (4) Date: Apr. 28, 2014

(87) PCT Pub. No.: WO2013/065114
PCT Pub. Date: May 10, 2013

(65) Prior Publication Data
US 2014/0288725 A1 Sep. 25, 2014

(51) Int. Cl.
*G05F 1/66* (2006.01)
*H02J 3/00* (2006.01)
*H02J 3/12* (2006.01)

(52) U.S. Cl.
CPC .................. *G05F 1/66* (2013.01); *H02J 3/00* (2013.01); *H02J 3/12* (2013.01); *H02J 2003/003* (2013.01)

(58) Field of Classification Search
CPC ....................................................... G05F 1/66
(Continued)

(56) References Cited

U.S. PATENT DOCUMENTS

| 7,355,374 B2 * | 4/2008 | Witte | H02M 3/156 |
| | | | 323/222 |
| 2004/0254899 A1 * | 12/2004 | Abe | G06Q 10/06 |
| | | | 705/412 |

(Continued)

FOREIGN PATENT DOCUMENTS

| EP | 1367689 A2 * | 12/2003 | H02J 3/008 |
| EP | 1367689 A3 | 12/2003 | |

(Continued)

OTHER PUBLICATIONS

Japanese Office Action dated Jun. 17, 2014 issued in corresponding Japanese Patent Appln. No. 2013-541503, with English translation (4 pages).

(Continued)

*Primary Examiner* — James D. Rutten
(74) *Attorney, Agent, or Firm* — Buchanan Ingersoll & Rooney PC

(57) ABSTRACT

A centralized voltage control apparatus calculates an optimum voltage distribution in a centralized control cycle period and determines, based on the relationship between the optimum voltage distribution and a proper voltage range, voltage upper and lower limit values for which a command is issued to each local voltage control apparatus taking into account voltage upper and lower limit margin amounts at respective points in a voltage control responsible range of the local voltage control apparatus for each local voltage control apparatus. The local voltage control apparatus adjusts, based on the voltage upper and lower limit values commanded from the centralized voltage control apparatus via a communication network, a control amount of a voltage control device every local control cycle shorter than the centralized control cycle period, to maintain the control (Continued)

voltage of the voltage control device between the voltage upper and lower limit values.

10 Claims, 6 Drawing Sheets

(58) Field of Classification Search
USPC .................................................. 700/298
See application file for complete search history.

(56) References Cited

U.S. PATENT DOCUMENTS

| | | | | |
|---|---|---|---|---|
| 2008/0150366 A1* | 6/2008 | Adest | ..................... | H02J 3/383 307/77 |
| 2009/0284232 A1* | 11/2009 | Zhang | ..................... | G05F 1/67 322/89 |
| 2010/0264892 A1* | 10/2010 | Takahashi | ............. | H02M 3/157 323/282 |
| 2010/0286840 A1* | 11/2010 | Powell | ................... | G01D 4/002 700/295 |
| 2011/0160930 A1* | 6/2011 | Batten | ..................... | G05F 1/67 700/298 |
| 2011/0231028 A1* | 9/2011 | Ozog | ..................... | G06Q 10/06 700/291 |
| 2015/0051746 A1* | 2/2015 | Mathiesen | ............... | H02J 3/14 700/291 |

FOREIGN PATENT DOCUMENTS

| | | |
|---|---|---|
| JP | 04-127841 A | 4/1992 |
| JP | H06-269138 A | 9/1994 |
| JP | 9-154235 A | 6/1997 |
| JP | 11-289663 A | 10/1999 |
| JP | 11-289664 A | 10/1999 |
| JP | 2000-102171 A | 4/2000 |
| JP | 2003-209926 A | 7/2003 |
| JP | 2004-056931 A | 2/2004 |
| JP | 2004-56996 A | 2/2004 |
| JP | 2004-274812 A | 9/2004 |
| JP | 2005-269744 A | 9/2005 |
| JP | 2007-288877 A | 11/2007 |
| JP | 2007-330067 A | 12/2007 |
| JP | 2009-065788 A | 3/2009 |
| JP | 2009-071889 A | 4/2009 |
| JP | 2009-177868 A | 8/2009 |
| JP | 2010-250599 A | 11/2010 |
| WO | 2010/129691 A2 | 11/2010 |

OTHER PUBLICATIONS

Office Action (Notice of Rejection) dated Aug. 9, 2016, by the Japanese Patent Office in corresponding Japanese Patent Application No. 2015-216350, and an English Translation of the Office Action. (10 pages).

International Search Report (PCT/ISA/210) dated Jan. 31, 2012, by the Japanese Patent Office as the International Searching Authority for International Application No. PCT/JP2011/075107.

Office Action (Examination Report) dated Jun. 18, 2018, by the India Patent Office in corresponding Indian Patent Application No. 3199/CHENP/2014. (6 pages).

* cited by examiner

POWER-DISTRIBUTION-SYSTEM VOLTAGE CONTROL SYSTEM, POWER-DISTRIBUTION-SYSTEM VOLTAGE CONTROL METHOD, AND CENTRALIZED VOLTAGE CONTROL APPARATUS

FIELD

The present invention relates to a power-distribution-system voltage control system, a power-distribution-system voltage control method, and a centralized voltage control apparatus that control a voltage of a power distribution system.

BACKGROUND

In general, a power distribution system includes a high-voltage system (e.g., 3300 volts to 6600 volts) and a low-voltage system (e.g., 100 volts to 200 volts). Receiving terminals of general consumers are connected to the low-voltage system. A power company is obliged to maintain the voltage at the receiving terminals of the general consumers within a proper range (e.g., in the case of power reception of 100 volts, the voltage is maintained between 95 volts and 107 volts). Therefore, the power company maintains the voltage at the receiving terminals of the general consumers by adjusting a control amount (e.g., operating a tap) of a voltage control device (e.g. an LRT (Load Ratio Control Transformer) or an SVR (Step Voltage Regulator)) connected to the high-voltage system. Note that, in the following explanation, a power distribution system indicates the high-voltage system.

Conventionally, concerning voltage control of the power distribution system, a local voltage control apparatus is generally spread that is integrated with a voltage control device of a transformer type, such as an LRT or an SVR, or provided side by side with the voltage control device and performs voltage control on the voltage control device in an autonomous distributed type based on measurement information (a voltage and a power flow) near a setting point of the voltage control device. Note that, as the voltage control device, besides the voltage control device of the transformer type, there is known voltage control devices of a reactive power control type, such as automatic ON/OFF phase modifying equipment (a static capacitor, a shunt reactor, etc.), an SVC (Static Var Compressor), and a PCS (Power Conditioning System) with a reactive power adjusting function. Local voltage control apparatuses respectively corresponding to these voltage control devices are also put to practical use. The PCS is, for example, a power conditioner for solar power generation. The PCS connects solar power generation equipment or a storage battery and a power distribution system.

These local voltage control apparatuses are configured on the premise that a load distribution of a power distribution system is uniform, that is, voltages at respective points of the power distribution system change in the same direction according to the elapse of time. However, in recent years, because of the diversification of a way of using electricity, the spread of a distributed power supply due to solar power generation, and the like, the load distribution of the power distribution system tends to fluctuate greatly in a non-uniform manner according to the elapse of time. Therefore, it is difficult to maintain a proper voltage with the conventional voltage control of the power distribution system.

Therefore, instead of the voltage control system of the autonomous distributed type, it is proposed to centrally control a voltage of a power distribution system in a consistent form in the entire system (a centralized control system). Specifically, a scheme is proposed in which measurement information (voltages and power flows) at a plurality of points in the power distribution system is collected in a centralized voltage control apparatus using a dedicated network, the centralized voltage control apparatus determines control amounts (tap positions, etc.) of respective voltage control devices based on these measurement information, and the control amounts for the voltage control devices are automatically remotely commanded from the centralized voltage control apparatus (see, for example, Patent Literatures 1 to 3).

Note that, a plurality of schemes are studied and disclosed concerning a technology for predicting and correcting a solar power generation amount according to an increase of solver power generation, a technology for separating a power flow value of a distribution line into a solar power generation amount and an actual load, a technology for estimating load distributions at respective system points from a power flow value of a distribution line, and the like (see, for example, Patent Literatures 1 to 3).

CITATION LIST

Patent Literature

Patent Literature 1: Japanese Patent Application Laid-Open No. H9-154235
Patent Literature 2: Japanese Patent Application Laid-Open No. H11-289663
Patent Literature 3: Japanese Patent Application Laid-Open No. H11-289664

SUMMARY

Technical Problem

However, in recent years, low-voltage system interconnection of a distributed power supply by solar power generation is increasing year by year. A solar power generation amount greatly changes according to a sudden change in the amount of solar radiation due to, for example, a flow of clouds during fine weather. It is anticipated that a voltage change of a power distribution system reaches a non-negligible level. The centralized voltage control apparatus collects measurement information of voltages and power flows at respective points of the power distribution system and allocates optimum control to each voltage control device. However, planning of the optimum control is performed based on the measurement information of voltages and power flows at the point of the planning. Therefore, there is a concern about problems explained below when a large number of low-voltage systems of the solar power generation are interconnected.

(1) If the measurement monitoring cycle is set long (e.g., about several tens of minutes), for example, when the solar power generation amount greatly changes because of a sudden change in the amount of solar radiation due to a flow of clouds, the centralized voltage control apparatus cannot follow sudden voltage fluctuation.

(2) On the contrary, if the measurement monitoring cycle is set short (e.g., about several minutes or less), because a communication load for measurement monitoring increases, capital investment in a communication network becomes enormous.

The present invention has been devised in view of the above and it is an object of the present invention to provide a power-distribution-system voltage control system, a power-distribution-system voltage control method, and a centralized voltage control apparatus capable of performing voltage maintenance following voltage fluctuation of a power distribution system due to an unpredictable factor, such as a solar power generation amount change, without increasing a communication load.

Solution to Problem

In order to solve the above problems and achieve the object, a power-distribution-system voltage control system according to the present invention includes a distribution line of a high-voltage system from which a power distribution system of the high-voltage system is configured and to which a low-voltage system including a distributed power supply is connected; a plurality of voltage control devices that are connected to the distribution line and control a voltage of the distribution line; local voltage control apparatuses that are connected to the voltage control devices, respectively, and adjust a control amount of the voltage control devices every second cycle, which is shorter than a first cycle, such that a voltage value controlled by the voltage control devices is maintained within a range of a voltage upper limit value and a voltage lower limit value that are updated every first cycle; and a centralized voltage control apparatus that includes a voltage-upper-and-lower-limit-values determining unit that is connected to each of the local voltage control apparatuses via a communication network, determines the voltage upper limit value and the voltage lower limit value that are updated every first cycle by the local voltage control apparatuses, and issues, via the communication network, a command to each of the local voltage control apparatuses setting the voltage upper limit value and the voltage lower limit value.

Advantageous Effects of Invention

According to the present invention, there is an effect that it is possible to perform voltage maintenance following voltage fluctuation of a power distribution system due to an unpredictable factor, such as a solar power generation amount change, without increasing a communication load.

DESCRIPTION OF EMBODIMENTS

Embodiments of a power-distribution-system voltage control system, a power-distribution-system voltage control method, and a centralized voltage control apparatus according to the present invention are explained in detail below based on the drawings. Note that the present invention is not limited by the embodiments.

First Embodiment

Figure 1:
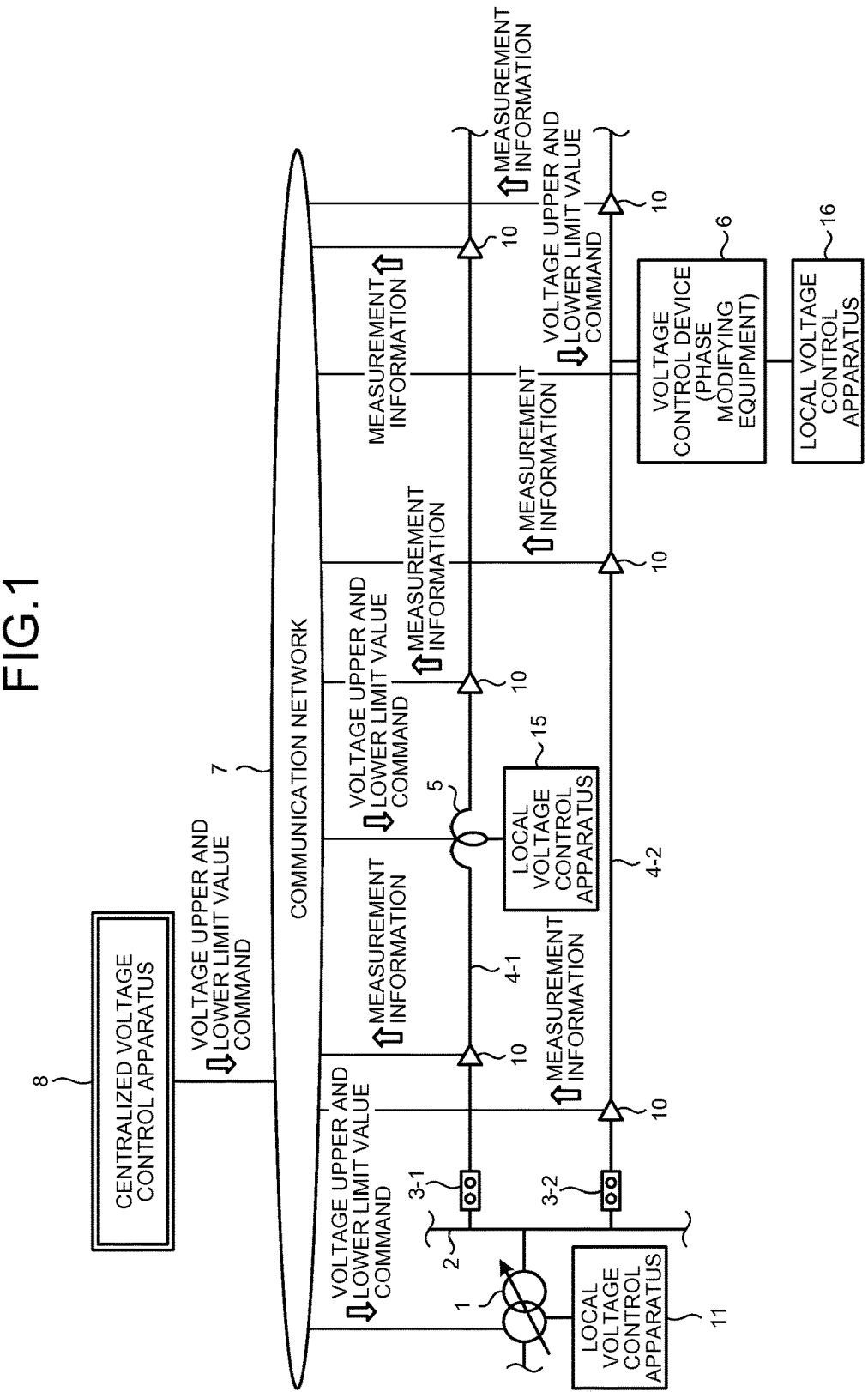
FIG. 1 is a diagram of an example of the configuration of a power-distribution-system voltage control system according to an embodiment.

FIG. 1 is a diagram of an example of the configuration of a power-distribution-system voltage control system according to the present embodiment. In FIG. 1, a voltage control device 1 is an LRT (Load Ratio Control Transformer) functioning as a transformer for power distribution set in, for example, a substation. A local voltage control apparatus 11 is connected to the voltage control device 1. The local voltage control apparatus 11 controls the voltage control device 1. The local voltage control apparatus 11 can be provided integrally or side by side with the voltage control device 1. The local voltage control apparatus 11 controls the voltage control device 1 by adjusting the control amount of the voltage control device 1, specifically, by adjusting the tap position. The local voltage control apparatus 11 has a communication function and is connected to a communication network 7.

A bus 2 is connected to the secondary side of the voltage control device 1. For example, two distribution lines 4-1 and 4-2 are connected to the bus 2 in parallel. The distribution lines 4-1 and 4-2 are distribution lines of a high-voltage system (a voltage level is, for example, 3300 volts to 6600 volts).

One end of the distribution line 4-1 is connected to the bus 2 via a circuit breaker 3-1. Voltage and power flow measuring apparatuses 10 that measure a voltage and a power flow of the distribution line 4-1 are set in a plurality of places on the distribution line 4-1. That is, the voltage and power flow measuring apparatuses 10 are connected to the distribution line 4-1, measure voltages and power flows in the connection places, and output the measured values of the voltages and the power flows as measurement information. The voltage and power flow measuring apparatuses 10 have a communication function and are connected to the communication network 7. The voltage and power flow measuring apparatuses 10 transmit the measurement information to a centralized voltage control apparatus 8, for example, periodically via the communication network 7.

On the distribution line 4-1, a voltage control device 5, which is an SVR (Step Voltage Regulator) for voltage drop compensation, is connected. A local voltage control apparatus 15 that controls the voltage control device 5 is connected to the voltage control device 5. For example, the local voltage control apparatus 15 can be provided integrally or side by side with the voltage control device 5. The local voltage control apparatus 15 controls the voltage control device 5 by adjusting the control amount of the voltage control device 5, specifically, adjusting the tap position. The local voltage control apparatus 15 has a communication function and is connected to the communication network 7.

One end of the distribution line 4-2 is connected to the bus 2 via a circuit breaker 3-2. The voltage and power flow measuring apparatuses 10 that measure voltages and power flows of the distribution line 4-2 are set in a plurality of places on the distribution line 4-2 in a similar manner to the case of the distribution line 4-1.

On the distribution line 4-2, a voltage control device 6, which is automatic ON/OFF phase modifying equipment for reactive power compensation, is connected. The voltage control device 6 is, for example, a shunt reactor (ShR). Note that, in general, the phase modifying equipment includes one or both of an ShR and a static Capacitor (SC). The phase modifying equipment can compensate for reactive power by being input to or paralleled off from a system via a circuit breaker (not shown in the figure). A local voltage control apparatus 16 that controls the voltage control device 6 is connected to the voltage control device 6. For example, the local voltage control apparatus 16 can be provided integrally or side by side with the voltage control device 6. The local voltage control apparatus 16 controls the voltage control device 6 by adjusting the control amount of the voltage control device 6, specifically, adjusting a reactive power output. The local voltage control apparatus 16 has a communication function and is connected to the communication network 7.

The distribution lines 4-1 and 4-2 are distribution lines of a high-voltage system. Although not shown in the figure, low-voltage distribution lines from which a low-voltage system (a voltage level is, for example, 100 volts to 200 volts) is configured are respectively connected to the distribution lines 4-1 and 4-2 via transformers. Loads are connected to the low-voltage distribution lines. Distributed power supplies, such as solar power generation apparatuses, are further connected to the low-voltage distribution lines. That is, in this embodiment, the distributed power supplies are interconnected to the low-voltage system. However, it goes without saying that this embodiment can also be applied when the distributed power supplies are not included in the low-voltage system. In the following explanation, unless specifically noted otherwise, a power distribution system means a high-voltage system. Note that, in the following explanation, for example, a solar power generation apparatus is explained as an example of the distributed power supply. Voltage control of the power distribution system means voltage control of the high-voltage system. The power distribution system includes the voltage control devices 1, 5, and 6, the local voltage control apparatuses 11, 15, and 16, the bus 2, the circuit breakers 3-1 and 3-2, the distribution lines 4-1 and 4-2, and the voltage and power flow measuring apparatuses 10.

Note that, in the example shown in the figure, the number of distribution lines connected to the bus 2 is two. However, the number of distribution lines is not limited to this example. The number of set voltage control devices is not limited to the example shown in the figure. As the voltage control devices, besides the LRT, SVR, and ShR shown in FIG. 1, for example, a static var compensator (SVC) and a power conditioning system (PCS) with a reactive power adjusting function can be provided according to a configuration.

The centralized voltage control apparatus 8 is connected to the local voltage control apparatuses 11, 15, and 16 and a plurality of the voltage and power flow measuring apparatuses 10 via the communication network 7. The communication network 7 is, for example, a dedicated network and is disposed for the purpose of power distribution system monitoring control. The centralized voltage control apparatus 8 determines, based on, for example, measurement information transmitted from the voltage and power flow measuring apparatuses 10, a voltage upper limit value and a voltage lower limit value (hereinafter also referred to as voltage upper and lower limit values) for specifying a control target voltage range of each local voltage control apparatus, for example, every centralized control cycle (e.g., one hour cycle), and issues, via the communication network 7, a command to each local voltage control apparatus setting the voltage upper and lower limit values.

The local voltage control apparatuses control, based on the voltage upper and lower limit value commands from the centralized voltage control apparatus 8, the voltage control devices, which are control targets of the local voltage control apparatuses, such that a voltage is maintained between the voltage upper and lower limit values. Every time the local voltage control apparatuses receive the voltage upper and lower limit value commands from the centralized voltage control apparatus 8, the local voltage control apparatuses update and set the voltage upper limit value and the voltage lower limit value. For example, the local voltage control apparatus 11 adjusts, based on the voltage upper and lower limit values commanded from the centralized voltage control apparatus 8, the control amount of the voltage control device 1 every local control cycle, which is shorter than the centralized control cycle, such that the voltage on the secondary side of the voltage control device 1 falls between the voltage upper and lower limit values (within the control target voltage range) in the centralized control cycle period during which the voltage upper and lower limit values are applied. For example, the local voltage control apparatus 16 adjusts, based on the voltage upper and lower limit values commanded from the centralized voltage control apparatus 8, the control amount of the voltage control device 6 every local control cycle (second cycle), which is shorter than the centralized control cycle (first cycle), such that a voltage at a power distribution system interconnection point of the voltage control device 6 falls between the voltage upper and lower limit values (within the control target voltage range) in the centralized control cycle period during which the voltage upper and lower limit values are applied.

Figure 2:
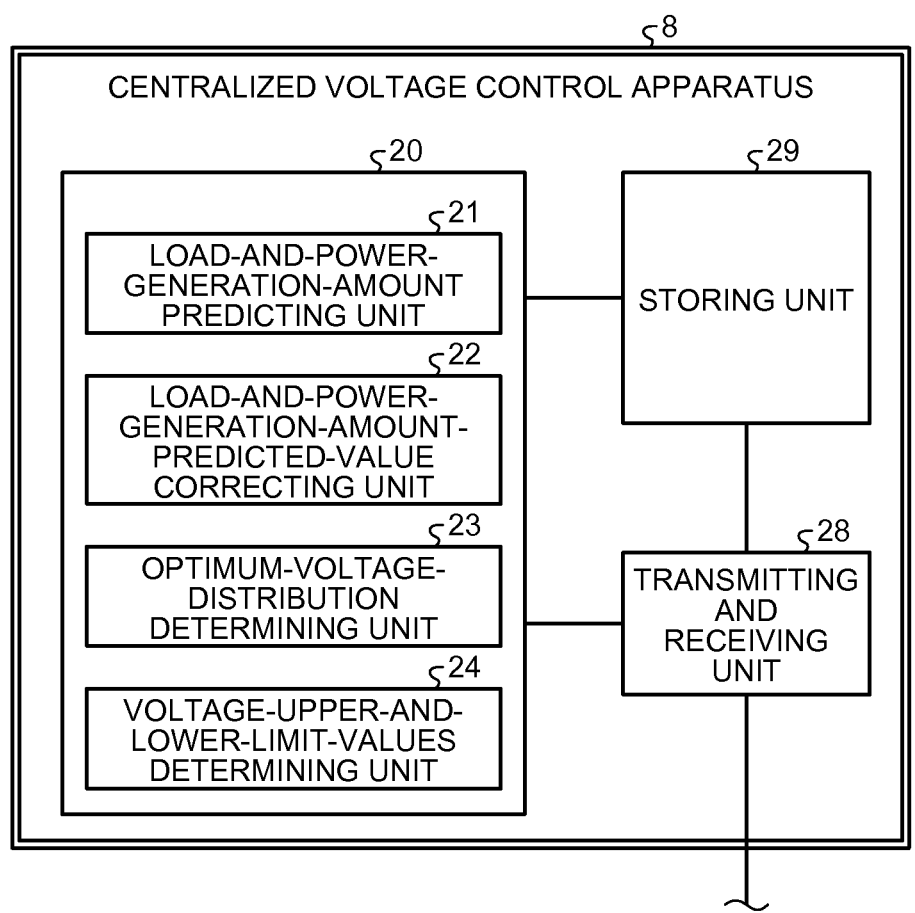
FIG. 2 is a diagram of an example of the internal configuration of a centralized voltage control apparatus 8.

FIG. 2 is a diagram of an example of the internal configuration of the centralized voltage control apparatus 8. As shown in FIG. 2, the centralized voltage control apparatus 8 includes a control unit 20, a storing unit 29 connected to the control unit 20, and a transmitting and receiving unit 28 connected to the control unit 20, the storing unit 29, and the communication network 7.

The control unit 20 includes, as functional components thereof, a load-and-power-generation-amount predicting unit 21, a load-and-power-generation-amount-predicted-values correcting unit 22, an optimum-voltage-distribution determining unit 23, and a voltage-upper-and-lower-limit-values determining unit 24. The load-and-power-generation-amount predicting unit 21 predicts a load/power generation amount distribution of the power distribution system in the future, for example, every centralized control cycle (e.g., one hour cycle). Note that details of the load/power generation amount distribution are explained below. The load-and-power-generation-amount-predicted-values correcting unit 22 corrects a predicted value of the load/power generation amount distribution in the centralized control cycle period based on the comparison result of the predicted value of the load/power generation amount distribution in the period and an actual value of the load/power generation amount distribution in the last centralized control cycle period. The actual value of the load/power generation amount distribution is calculated based on measurement information (voltages and power flows).

The optimum-voltage-distribution determining unit 23 performs power flow calculation based on the corrected predicted value of the load/power generation amount distribution and searches for the best solution for optimizing a value of an evaluation function of the power distribution system to thereby determine an optimum voltage distribution in the centralized control cycle period and an optimum control amount of each voltage control device.

The voltage-upper-and-lower-limit-values determining unit 24 determines, based on the determined optimum voltage distribution, voltage upper and lower limit values, which are upper and lower limits in the control target voltage range, of each local voltage control apparatus in the centralized control cycle period and issues, via the communication network 7, a command to each local voltage control apparatus setting the voltage upper and lower limit values. Note that details of the processing for determining voltage upper and lower limit values by the voltage-upper-and-lower-limit-values determining unit 24 are explained below. The following is an overview of the processing.

First, the voltage-upper-and-lower-limit-values determining unit 24 acquires, from the storing unit 29, information concerning a voltage control responsible range allocated in advance to each of the local voltage control apparatuses. The voltage control responsible range is a range (or a section) on the distribution line 4-1 or 4-2 and is a range for which a local voltage control apparatus allocated with the range or a voltage control device connected to the local voltage control apparatus is responsible in the control of a voltage in the range. A proper voltage range is set in advance for each of voltage control responsible ranges. The proper voltage range is a proper voltage range that the high-voltage system should maintain. With respect to each local voltage control apparatus, the voltage-upper-and-lower-limit-values determining unit 24 selects a minimum voltage-upper-limit margin amount out of voltage upper limit margin amounts, which are differences between optimum voltages and the upper limit value of the proper voltage in the voltage control responsible range, selects a minimum voltage-lower-limit margin amount out of voltage lower limit margin amounts, which are differences between optimum voltages and the lower limit value of the proper voltage in the voltage control responsible range, determines, as a voltage upper limit value in the control target voltage range, a value obtained by adding the minimum voltage-upper-limit margin amount in the voltage control responsible range to an optimum voltage of the voltage control device, and determines, as a voltage lower limit value in the control target voltage range, a value obtained by subtracting the minimum voltage-lower-limit margin amount in the voltage control responsible range from the optimum voltage of the voltage control device.

The centralized voltage control apparatus 8 can be configured as a server including, for example, a CPU, a memory, a storage device, such as a hard disk, and a communication function. The control unit 20 is realized by the CPU that performs control processing according to a control program stored in the memory. The storing unit 29 collectively represents the memory, the storage device, and the like. The transmitting and receiving unit 28 represents a communication function. Note that the centralized voltage control apparatus 8 can be set in, for example, a substation.

Figure 3:
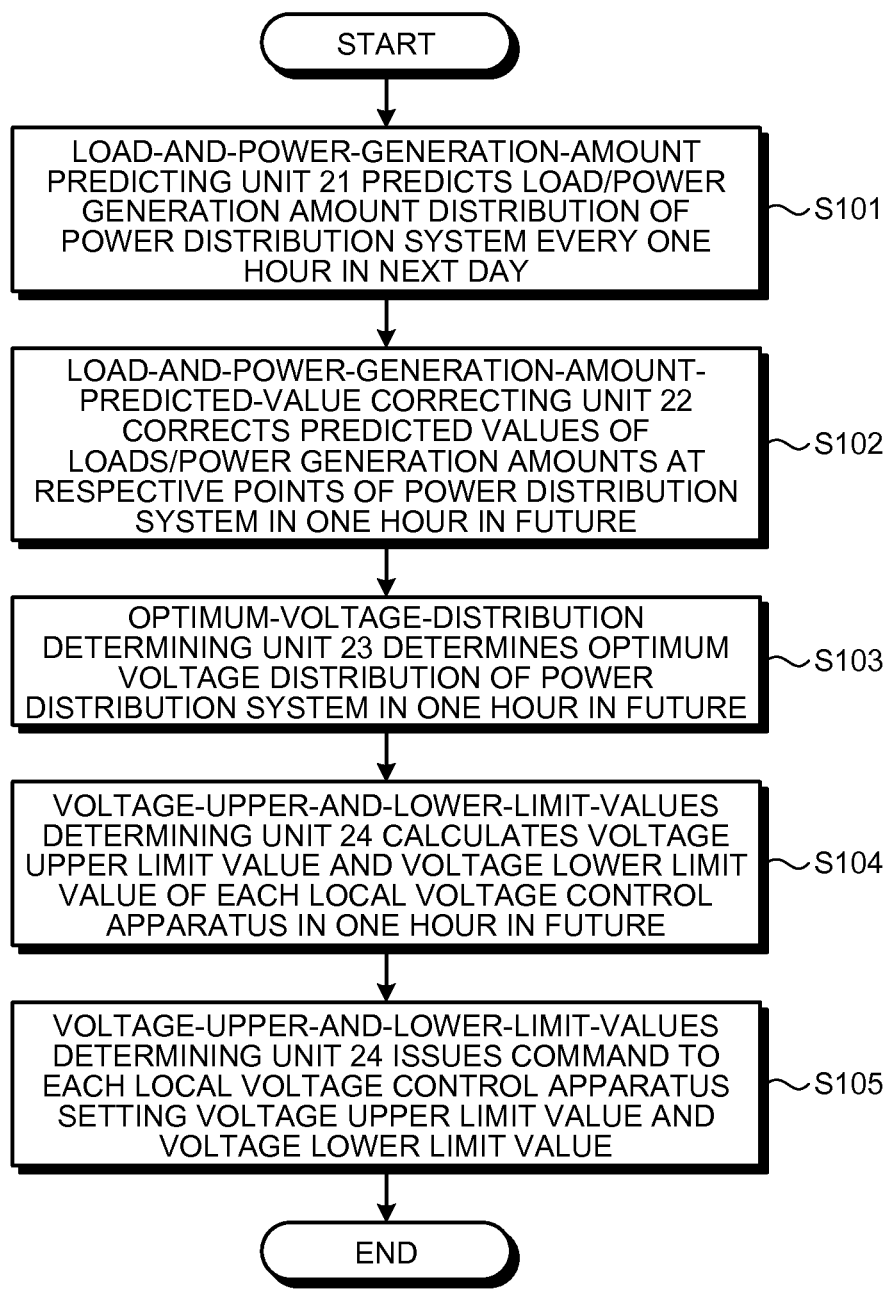
FIG. 3 is a flowchart for explaining the operation in the embodiment.

The operation in this embodiment is explained with reference to FIG. 3. FIG. 3 is a flowchart for explaining the operation in this embodiment.

First, the voltage and power flow measuring apparatuses 10 periodically measure voltages and power flows at setting points thereof and store voltage and power flow data. The voltage and power flow measuring apparatuses 10 respectively transmit, for example, the ten-minute average of the measured voltage and power flow data to the centralized voltage control apparatus 8 via the communication network 7. After receiving the ten-minute average of the voltage and power flow data with the transmitting and receiving unit 28, the centralized voltage control apparatus 8 can calculate loads/power generation amounts at respective points of the power distribution system by, for example, calculating a difference in the power flow average value between measurement points adjacent to one another. The centralized voltage control apparatus 8 stores the loads/power generation amounts in the storing unit 29 as load-and-power-generation-amount data. The loads/power generation amounts (the load-and-power-generation-amount data) are equivalent to, for example, amounts obtained by subtracting power generation amounts from a pure load and can take positive or negative values according to the balance between the loads and the power generation amounts. That is, the loads/power generation amounts (the load-and-power-generation-amount data) are equivalent to differences between the pure load and the power generation amounts at the respective points of the power distribution system. The load-and-power-generation-amount data is periodically stored and compiled as a database.

Subsequently, at S101 in FIG. 3, the load-and-power-generation-amount predicting unit 21 predicts a load/power generation amount distribution of the power distribution system, for example, every one hour in the next day from the load-and-power-generation-amount data at the respective points of the power distribution system stored in the storing unit 29. In predicting the load/power generation amount distribution, in order to separately predict a load and a power generation amount, first, the load-and-power-generation-amount predicting unit 21 uses only the load-and-power-generation-amount data in a fine-weather period of time, excludes a theoretical power generation amount (calculated from a solar power generation rated capacity, a solar panel setting angle, latitude, time and date, predicted temperature, and power generation efficiency), and calculates an actual load, which is a pure load.

Subsequently, the load-and-power-generation-amount predicting unit 21 collects result loads for a plurality of days, calculates a correlation between loads and temperatures in the same day of the week (weekday/holiday section) and the same period of time, and predicts loads at the respective points of the power distribution system every one hour of the next day from the correlation and a predicted temperature of the next day. Assuming that a power generation amount in the next day is the theoretical power generation amount, the load-and-power-generation-amount predicting unit 21 subtracts a predicted power generation amount from a predicted load and creates load-and-power-generation-amount data at the respective points of the power generation system every one hour of the next day.

Note that, in this embodiment, for example, the load/power generation amount distribution every one hour of the next day is predicted. However, the prediction of the load/power generation amount distribution is not limited to this. For example, a load/power generation amount distribution every fixed period in the future can be predicted. Note that one hour period or the fixed period corresponds to the centralized control cycle explained above. Whereas the prediction of the load/power generation amount is performed, for example, every one hour, measurement values of voltages and power flows are not the one-hour average but, for example, the ten-minute average. This is for the purpose of, in calculating a correlation between loads and temperatures in the same day of the week (week day/holiday section) and the same period of time, improving the accuracy of the correlation by increasing the number of pieces of measurement data and for the purpose of grasping a fluctuation state of loads in one hour. This can be used for grasping a period of time during which load fluctuation is large in setting of a control limit of each voltage control device at S301 in FIG. 4 explained below. However, the measurement values of voltages and power flows can be, for example, the one-hour average.

Subsequently, at S102, the load-and-power-generation-amount-predicted-values correcting unit 22 corrects the predicted values of the loads/power generation amounts of the power distribution system in one hour in the future. Specifically, concerning the averages of the loads/power generation amounts at the respective points of the power distribution system in one hour in the past, the load-and-power-generation-amount-predicted-values correcting unit 22 compares actual values (calculated based on actual measurement values) and the predicted values to calculate a ratio between the actual values and the predicted values, and multiplies the ratio by the predicted values of the loads/power generation amounts in one hour in the future to thereby correct the predicted values of the loads/power generation amounts at the respective points of the system in one hour in the future. Accordingly, it is expected that the accuracy of the predicted values is improved.

Subsequently, at S103, the optimum-voltage-distribution determining unit 23 determines an optimum voltage distribution of the power distribution system in one hour in the future based on the predicted values of the loads/power generation amounts at the respective points of the power distribution system in one hour in the future created at S102. Details of this processing are explained below with reference to FIG. 4. Note that the processing at S102 can be omitted and the optimum-voltage-distribution determining unit 23 can determine the optimum voltage distribution of the power distribution system in one hour in the future based on the predicted values of the loads/power generation amounts at the respective points of the power distribution system in one hour in the future created at S101. At S101, the load-and-power-generation-amount predicting unit 21 predicts the load/power generation amount distribution in one hour in the future based on the measurement information transmitted from the voltage and power flow measuring apparatuses 10. However, the prediction of the load/power generation amount distribution is not limited to this. For example, a database concerning load-and-power-generation-amount data can be given to the storing unit 29 in advance and the load-and-power-generation-amount predicting unit 21 can predict the load/power generation amount distribution referring to the database. In this case, the voltage and power flow measuring apparatus 10 does not have to be provided and the processing at S102 is omitted.

Subsequently, at S104, the voltage-upper-and-lower-limit-values determining unit 24 calculates, based on the optimum voltage distribution of the power distribution system, a voltage upper limit value and a voltage lower limit value of each local voltage control apparatus in one hour in the future. Details of this processing are explained below with reference to FIG. 5.

Subsequently, at S105, the voltage-upper-and-lower-limit-values determining unit 24 issues a command to each local voltage control apparatus setting the voltage upper limit value and the voltage lower limit value. Note that, when another voltage control device is set on the downstream side of the voltage control device, for example, when an SVR is set on the load side of an LRT (see the distribution line 4-1), the voltage-upper-and-lower-limit-values determining unit 24 specifies the order of control such that the voltage-upper-and-lower-limit-values determining unit 24 first issues a command to the local voltage control apparatus on the downstream side setting the voltage upper and lower limit values.

The local voltage control apparatuses adjust the control amounts of the voltage control devices, which are control targets, based on the voltage upper and lower limit value commands from the centralized voltage control apparatus 8. Specifically, the local voltage control apparatuses adjust the control amounts of the voltage control devices according to the necessity every local control cycle, which is shorter than the centralized control cycle (one hour), to maintain a voltage between the voltage upper and lower limit values. Every time each local voltage control apparatus receives the voltage upper and lower limit value command every centralized control cycle from the centralized voltage control apparatus 8, the local voltage control apparatus updates and sets the voltage upper limit value and the voltage lower limit value.

Figure 4:
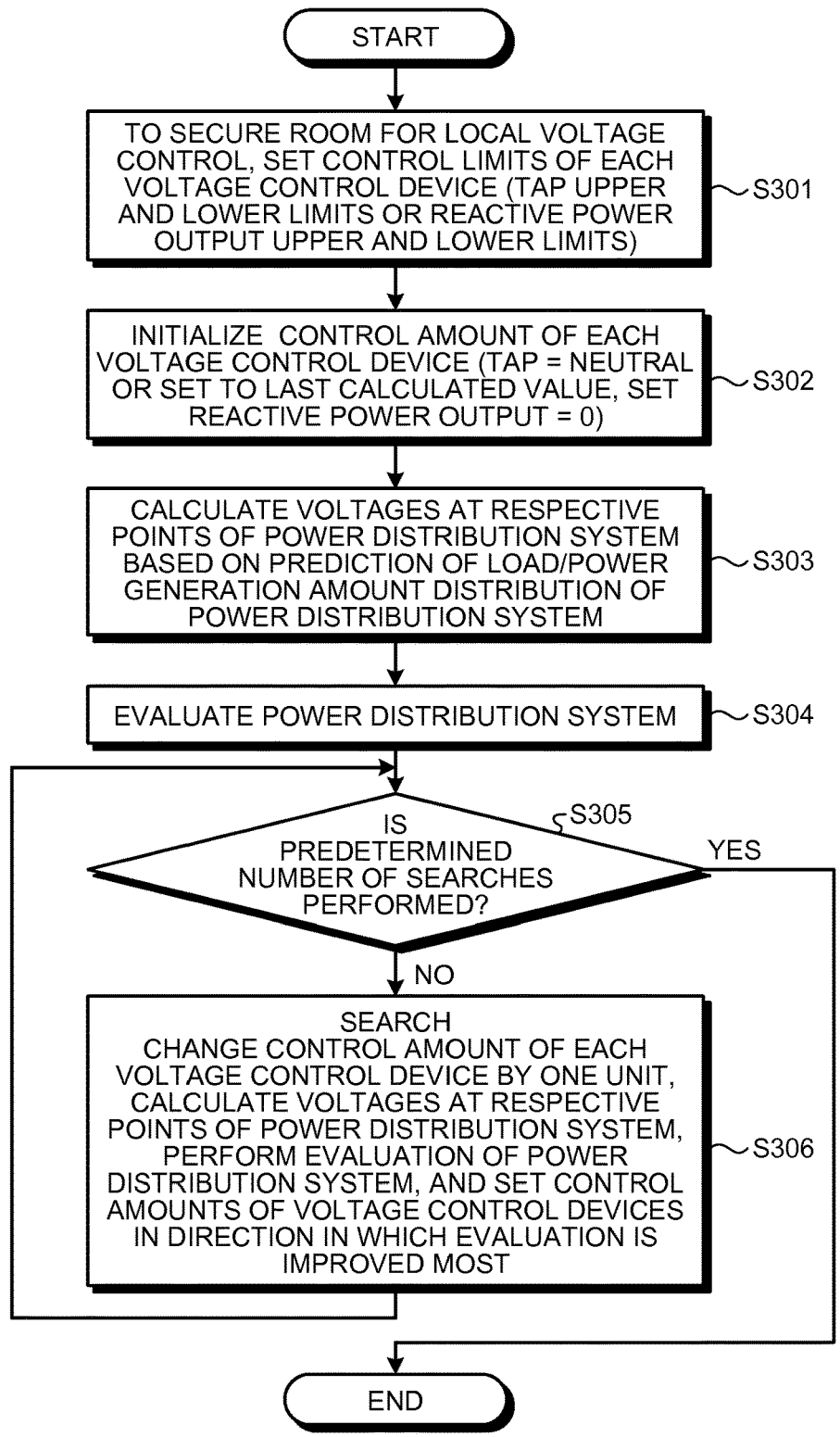
FIG. 4 is a flowchart for explaining details of processing at S103 in FIG. 3.

Details of the processing at S103 in FIG. 3 are explained with reference to FIG. 4. FIG. 4 is a flowchart for explaining the details of the processing at S103 in FIG. 3 and represents a flow for calculating an optimum voltage distribution of the power distribution system in one hour in the future.

First, at S301, in order to secure room for local control of each voltage control device, the optimum-voltage-distribution determining unit 23 sets control limits of each voltage control device (in the case of a voltage control device of a transformer type, tap upper and lower limits and, in the case of a voltage control device of a reactive power control type, reactive power output upper and lower limits). However, concerning a period of time when large voltage fluctuation is predicted, that is, a period of time when load fluctuation is large (e.g., morning, before and after a lunch break, and a lighting period of time), and a period of time when power generation fluctuation is large (e.g., daytime when a theoretical power generation amount is large), the optimum-voltage-distribution determining unit 23 secures the room of the local control large taking into account the directivity of fluctuation, such as a rising or falling tendency.

Subsequently, at S302, the optimum-voltage-distribution determining unit 23 initializes the control amount of each voltage control device. In the case of the voltage control device of the transformer type, the optimum-voltage-distribution determining unit 23 sets the tap position to a calculated value when an optimum voltage distribution is calculated, for example, one hour ago (a neutral value when there is no last calculated value). In the case of the voltage control device of the reactive power control type, the optimum-voltage-distribution determining unit 23 sets a reactive power output to, for example, 0 (nil).

Subsequently, at S303, the optimum-voltage-distribution determining unit 23 calculates, based on the prediction of the load/power generation amount distributions at the respective points of the power distribution system, power flow at the set control amounts (tap positions or reactive power amounts) of the voltage control devices and calculates voltages at the respective points of the power distribution system.

Subsequently, at S304, the optimum-voltage-distribution determining unit 23 evaluates the power distribution system based on the result of the power flow calculation. Specifically, the optimum-voltage-distribution determining unit 23 evaluates the power distribution system by evaluating values of evaluation functions (target functions) set for evaluation items of the power distribution system. The evaluation item of the first priority is violation (deviation) amounts from the proper voltage ranges (the proper voltage upper limit values and the proper voltage lower limit values; see FIG. 5) of the voltages at the respective points of the power distribution system. That is, an optimum voltage distribution is determined such that the sum of violation (deviation) amounts from the proper voltage ranges of the voltages at the respective points of the power generation system is minimized. The evaluation item of the second priority is, for example, voltage margins (margin amounts to the proper voltage upper and lower limit values) at the respective points of the power distribution system. If the voltage margins at the respective points of the power distribution system are small, the voltage upper and lower limit width of the voltage control devices decreases and the voltage control devices frequently operate with slight voltage fluctuation. Therefore, evaluation is higher as the sum of the voltage margins is larger. The evaluation item of the third priority can be the sum of change amounts of the control amounts of the voltage control devices from the initial setting values of the control amounts. In the case of the voltage control device of the reactive power control type, the change amounts of the control amounts of the voltage control devices from the initial setting values of the control amounts are reactive power output amounts (S302). In the case of the voltage control device of the transformer type, the change amounts are differences of the tap positions from the initial setting tap positions (S302). A reduction in the sum of the change amounts leads to a reduction in the number of operations of the voltage control devices. Further, the evaluation item of the fourth priority can be a power transmission loss of the entire power distribution system (an active power loss+a reactive power loss). Evaluation is higher as the power transmission loss is smaller. Note that most of the power transmission loss is the active power loss. The loss is smaller as a voltage is higher. However, the voltage margins (on the upper limit value side) at the respective points of the power distribution system of the second priority decreases. Therefore, this is the evaluation item that shows an effect only when there are considerable margins in voltage upper and lower limits at the respective points of the power distribution system.

The evaluation function is basically set concerning the evaluation item of the first priority. However, the evaluation functions can be set concerning the item of the first priority and the item of the second priority. In this case, the sum of the respective weighted evaluation functions is set as an evaluation function of the entire power distribution system. Further, high-order priority items can also be included in the evaluation functions according to the power distribution system. The evaluation functions can be configured to be optimized most (evaluated highest), for example, when the evaluation functions take minimum values.

Subsequently, at S305, the optimum-voltage-distribution determining unit 23 determines whether a predetermined number of searches is performed. When the predetermined number of searches is performed (Yes at S305), the optimum-voltage-distribution determining unit 23 ends the processing. When the predetermined number of searches is not performed (No at S305), the optimum-voltage-distribution determining unit 23 proceeds to processing at S306.

Subsequently, at S306, the optimum-voltage-distribution determining unit 23 changes the control amount of each voltage control device by, for example, one unit (for example, raises or lowers the tap by, for example, one stage or increases or decreases the reactive power by, for example, 5%), and performs voltage calculation at the respective points of the power distribution system (same as S303) and evaluation of the power distribution system (same as S304). The optimum-voltage-distribution determining unit 23 carries out the voltage calculation and the evaluation concerning all the voltage control devices, compares the evaluation results, and changes the setting of the control amounts of the voltage control devices in a direction in which the evaluation is improved most. An optimization algorithm is disclosed in, for example, Japanese Patent Application Laid-Open No. 2010-250599. Therefore, explanation of details of the optimization algorithm is omitted. Note that, the power control device capable of continuously changing the control amount, such as reactive power control of an SVC, equivalent effects are obtained even if an optimum control amount is calculated by the quadratic programming, which is one of continuous system optimization methods.

As explained above, after the predetermined number of searches is carried out, the optimum-voltage-distribution determining unit 23 can determine, as the best solution for optimizing values of the evaluation functions, an optimum voltage distribution of the power distribution system in one hour in the future and optimum control amounts of the voltage control devices.

Figure 5:
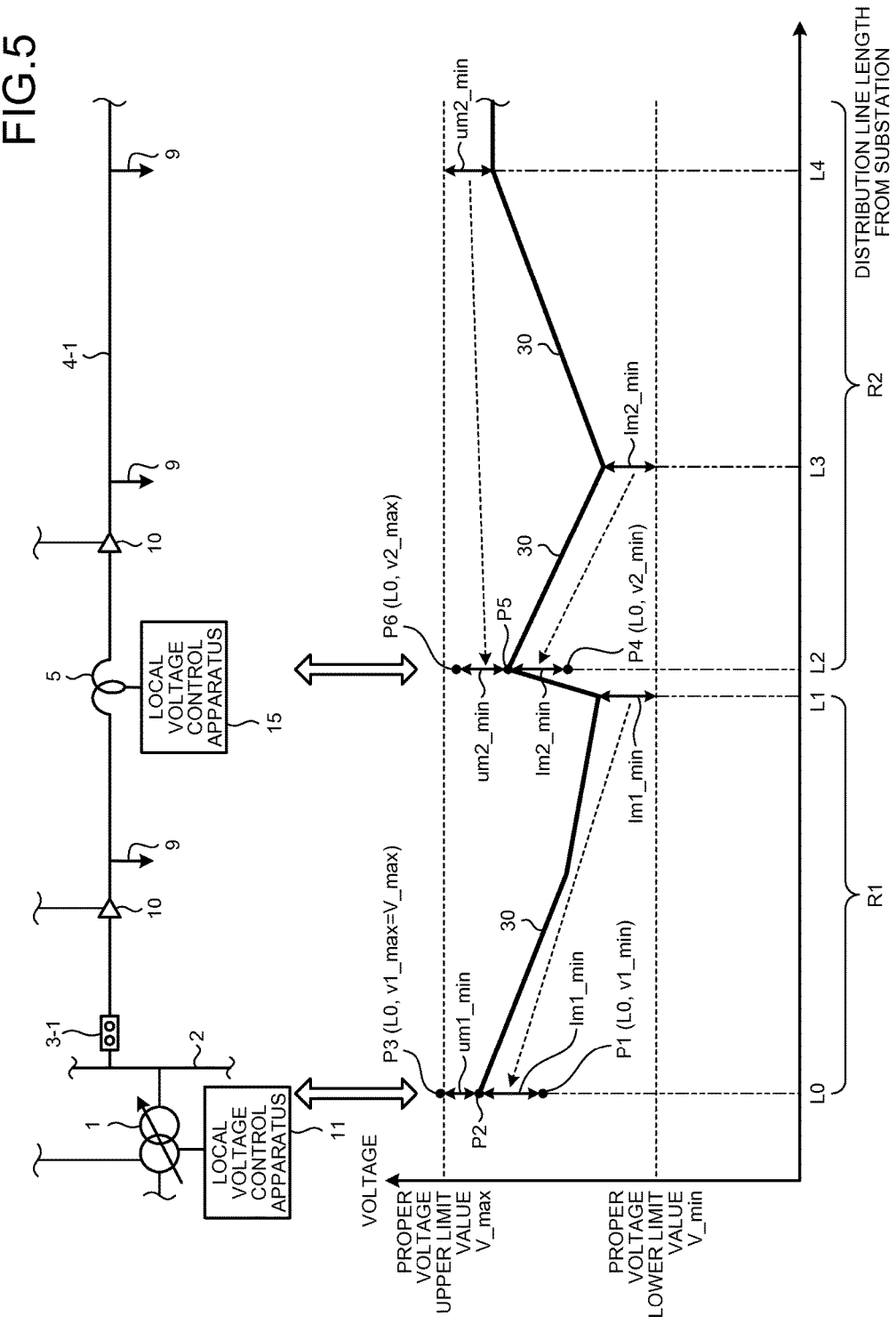
FIG. 5 is a diagram for explaining details of processing at S104 in FIG. 3.
Figure 6:
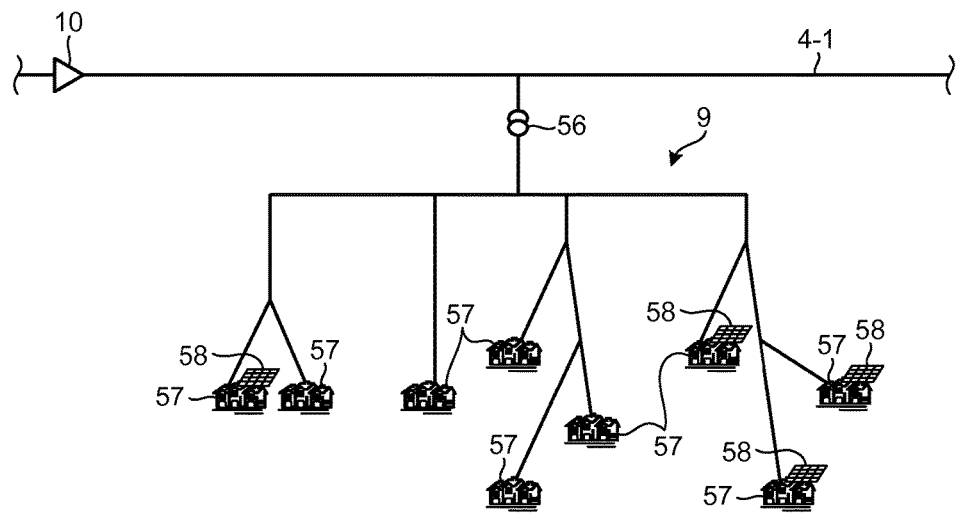
FIG. 6 is a diagram of an example of the configuration of a low-voltage system 9.

Details of the processing at S104 in FIG. 3 are explained with reference to FIG. 5. FIG. 5 is a diagram for explaining the details of the processing at S104 in FIG. 3. In FIG. 5, part of the power distribution system is shown on the upper side and the relationship between the distribution line length and the voltage is shown on the lower side to correspond to the part of the power distribution system. On the upper side of FIG. 5, a portion mainly including the distribution line 4-1 in the power distribution system shown in FIG. 1 is shown. In FIG. 5, low-voltage systems 9 connected to the distribution line 4-1 are also shown. The low-voltage systems 9 are each configured, for example, as shown in FIG. 6. Loads 57 and solar power generation apparatuses 58 are connected to the distribution line 4-1 via a transformer 56.

In the lower side of FIG. 5, an optimum voltage 30 is shown with respect to the distribution line length of the distribution line 4-1 from a substation. The optimum voltage 30 is calculated in the processing at S103 in FIG. 3. In FIG. 5, an upper limit value V_max and a lower limit value V_min of proper voltage ranges are shown. The proper voltage ranges are determined in advance, depending on time, as a voltage range within which a voltage on the high-voltage side should fall at setting points of loads, for each of the setting points. The proper voltage ranges are set such that electric power can be stably supplied to the low-voltage side. Note that, in FIG. 5, the proper voltage ranges are described as the same, for example, at the respective points of the power distribution system. However, in general, the proper voltage ranges are different from each other between the respective points of the power distribution system and change according to a period of time.

On the lower side of FIG. 5, the secondary side (a load side) of the voltage control device 1 is set as a start point (distribution line length L0), the distribution line length up to the primary side (a power supply side) of the voltage control device 5 is represented by L1, and the distribution line length up to the secondary side of the voltage control device 5 (the SVR) is represented by L2.

As explained above, the voltage control devices respectively have the voltage control responsible ranges. The voltage control responsible range of the voltage control device 1 is a range from the voltage control device 1 to the voltage control device 5 on the downstream side and is shown in the figure as a range R1 of the distribution line 4-1 having a distribution line length that is between L0 and L1. The voltage control responsible range of the voltage control device 5 is a range from the voltage control device 5 to the next voltage control device (not shown in the figure) on the downstream side and is shown in the figure as a range R2 of the distribution line 4-1 having a distribution line length that is a remaining length from L2.

The voltage-upper-and-lower-limit-values determining unit 24 determines voltage upper and lower limit values, which are upper and lower limits of control target command voltage ranges for which a command is issued to the local voltage control apparatuses 11 and 15, as explained below.

First, an explanation is made of the case of the local voltage control apparatus 11. The voltage-upper-and-lower-limit-values determining unit 24 selects a minimum voltage-upper-limit margin amount out of voltage upper limit margin amounts, which are differences between the optimum voltage 30 and the upper limit value V_max of the proper voltage in the range R1, which is the voltage control responsible range of the local voltage control apparatus 11. In an example shown in the figure, the minimum voltage-upper-limit margin amount is obtained at a point where the distribution line length is L0. The value of the minimum voltage-upper-limit margin amount is represented by um1_min. The voltage-upper-and-lower-limit-values determining unit 24 selects a minimum voltage-lower-limit margin amount out of voltage lower limit margin amounts, which are differences between the optimum voltage 30 and the lower limit value V_min of the proper voltage in the range R1, which is the voltage control responsible range of the local voltage control apparatus 11. In the example shown in the figure, the minimum voltage-lower-limit margin amount is obtained at a point where the distribution line length is L1. The value of the minimum voltage-lower-limit margin amount is represented by lm1_min. The voltage-upper-and-lower-limit-values determining unit 24 sets, as a voltage upper limit value in the control target voltage range, a value obtained by adding the minimum voltage-upper-limit margin amount um1_min to a value of the optimum voltage 30 of the voltage control device 1 and sets, as a voltage lower limit value of the control target voltage range, a value obtained by subtracting the minimum voltage-lower-limit margin amount lm1_min from the value of the optimum voltage 30 of the voltage control device 1. Specifically, the value of the optimum voltage 30 of the voltage control device 1 is a value of the optimum voltage 30 on the output side (the load side or the secondary side) of the voltage control device 1 and represents a voltage value at a point indicated by P2 in the figure. The voltage upper limit value is represented by v1_max and the voltage lower limit value is represented by v1_min. The control target voltage range of the local voltage control apparatus 11 is a range between point P3 and point P1. Note that, in the example shown in the figure, v1_max=V_max.

As explained above, the control target voltage range of the local voltage control apparatus 11 is determined taking into account not only the voltage upper and lower margin amounts near the setting place of the voltage control device 1 but also the voltage upper and lower limit margin amounts at the respective points in the range R1, which is the voltage control responsible range of the voltage control device 1. Therefore, although the local voltage control apparatus 11 itself locally controls the voltage control device 1 in the control target voltage range, it is possible to maintain a proper voltage in the wide range R1.

Next, an explanation is made of the case of the local voltage control apparatus 15. The voltage-upper-and-lower-limit-values determining unit 24 selects a minimum voltage-upper-limit margin amount out of voltage upper limit margin amounts, which are absolute values of differences between the optimum voltage 30 and the upper limit value V_max of the proper voltage in the range R2, which is the voltage control responsible range of the local voltage control apparatus 15. In an example shown in the figure, the minimum voltage-upper-limit margin amount is obtained at a point where the distribution line length is L4. The value of the minimum voltage-upper-limit margin amount is represented by um2_min. The voltage-upper-and-lower-limit-values determining unit 24 selects a minimum voltage-lower-limit margin amount out of voltage lower limit margin amounts, which are absolute values of differences between the optimum voltage 30 and the lower limit value V_min of the proper voltage in the range R2, which is the voltage control responsible range of the local voltage control apparatus 15. In the example shown in the figure, the minimum voltage-lower-limit margin amount is obtained at a point where the distribution line length is L3. The value of the minimum voltage-lower-limit margin amount is represented by lm2_min. The voltage-upper-and-lower-limit-values determining unit 24 sets, as a voltage upper limit value of the control target voltage range, a value obtained by adding the minimum voltage-upper-limit margin amount um2_min to a value of the optimum voltage 30 of the voltage control device 5 and sets, as a voltage lower limit value of the control target voltage range, a value obtained by subtracting the minimum voltage-lower-limit margin amount lm2_min from the value of the optimum voltage 30 of the voltage control device 5. Specifically, the value of the optimum voltage 30 of the voltage control device 5 is a value of the optimum voltage 30 on the output side (the load side or the secondary side) of the voltage control device 5 and represents a voltage value at a point indicated by P5 in the figure. Note that, when a voltage control device is a reactive power compensation type, an optimum voltage of the voltage control device is an optimum voltage at a power distribution system interconnection point of the voltage control device. In FIG. 5, the voltage upper limit value is represented by v2_max and the voltage lower limit value is represented by v2_min. The control target voltage range of the local voltage control apparatus 15 is a range between point P4 and point P6.

As explained above, the control target voltage range of the local voltage control apparatus 15 is determined taking into account not only the voltage upper and lower margin amounts near the setting place of the voltage control device 5 but also the voltage upper and lower limit margin amounts at the respective points in the range R2, which is the voltage control responsible range of the voltage control device 5. Therefore, although the local voltage control apparatus 15 itself locally controls the voltage control device 5 in the control target voltage range, it is possible to maintain a proper voltage in the wide range R2.

Figure 7:
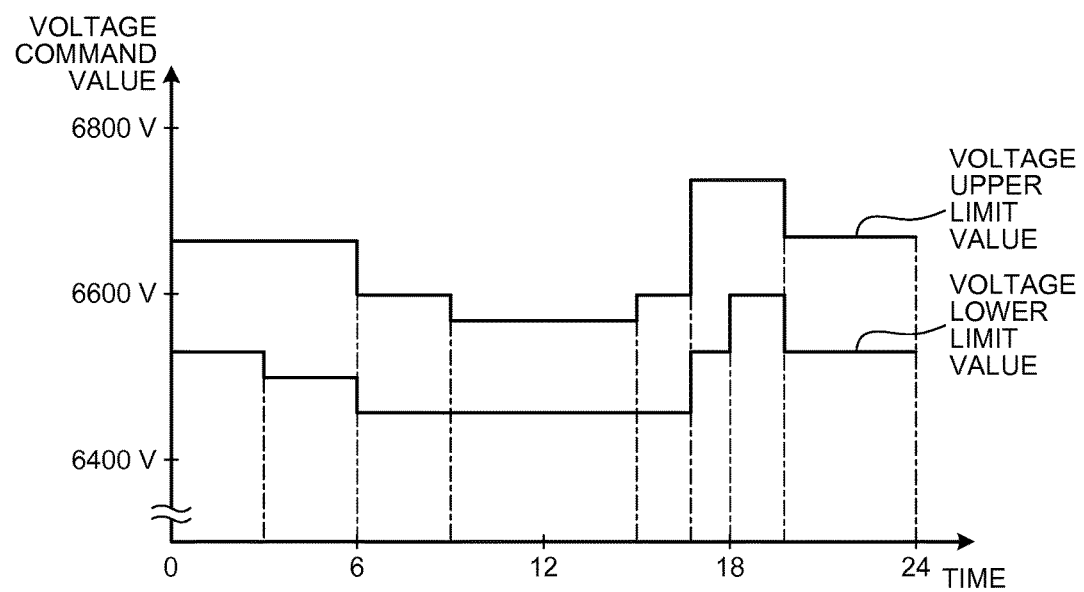
FIG. 7 is a diagram of an example of time fluctuation of voltage upper and lower limit values for which a command is issued to local voltage control apparatuses.

FIG. 7 is a diagram of an example of time fluctuation of voltage upper and lower limit values for which a command is issued to local voltage control apparatuses. In the example shown in the figure, a proper voltage range is a range between 6400 volts and 6800 volts irrespective of a period of time. As indicated by the example, in general, the voltage upper and lower limit values fluctuate according to a period of time.

A voltage control responsible range of a voltage control device is explained in detail. A voltage control device of a transformer type sets, for example, the load side (downstream side) of a transformer of the voltage control device as the voltage control responsible range. However, when another voltage control device is present on the load side, the voltage control device sets a range up to the power supply side (upstream side) of another voltage control device as the voltage control responsible range of the voltage control device.

A voltage control device of a reactive power control type sets, when a voltage control device of a transformer type is present on the power supply side (upstream side) of the voltage control device, a range up to the load side (downstream side) of a transformer of the voltage control device of the transformer type and a range on the load side (downstream side) of the voltage control device as a voltage control responsible range. However, when still another voltage control device is present on the load side (downstream side), a range up to the power supply side (upstream side) of the still another voltage control device is included in the voltage control responsible range. Therefore, the voltage control responsible range of the voltage control device of the reactive power control type overlaps the voltage control responsible range of the voltage control device of the transformer type present on the power supply side (upstream side) of the voltage control device.

Therefore, in a local voltage control apparatus that controls the voltage control device of the reactive power control type, an integration amount threshold for voltage upper and lower limit value deviation determination is set smaller than that of a local voltage control apparatus that controls the voltage control device of the transformer type. The local voltage control apparatus is configured to secure reserve power for local control by quickly performing reactive power control (short cycle control) with respect to a voltage change and simultaneously performing long cycle control for slowly bringing a reactive power control amount integration value close to zero. That is, the local voltage control apparatus causes the voltage control device of the reactive power control type, which is capable of responding at high speed, to immediately respond to sudden voltage fluctuation of the power distribution system and, while gradually adjusting a reactive power output of the voltage control device of the reactive power control type in a direction toward 0 in preparation for the next sudden voltage fluctuation, allows the voltage control device of the transformer type present on the upstream side to operate to compensate for the reactive power output. The control explained above is carried out in an overlapping range of the voltage control responsible ranges.

As explained above, in this embodiment, the centralized voltage control apparatus 8 calculates an optimum voltage distribution in a fixed period in the future (in a centralized control cycle period) and determines, based on the relationship between the optimum voltage distribution and a proper voltage range, voltage upper and lower limit values for which a command is issued to each local voltage control apparatus taking into account voltage upper and lower limit margin amounts at respective points in a voltage control responsible range of the local voltage control apparatus for each local voltage control apparatus. On the other hand, the local voltage control apparatus adjusts, based on the voltage upper and lower limit values commanded from the centralized voltage control apparatus 8 via the communication network 7, a control amount of a voltage control device, which is a control target of the local voltage control apparatus, every local control cycle, which is shorter than the centralized control cycle period, to maintain the control voltage of the voltage control device between the voltage upper and lower limit values. In this way, the centralized voltage control apparatus 8 issues only the voltage upper and lower limit value command to each local voltage control apparatus. Each local voltage control apparatus independently performs local control according to the command from the centralized voltage control apparatus 8. The centralized control by the centralized voltage control apparatus 8 and the local control by the local voltage control apparatuses are divided.

Consequently, the control itself of the voltage control devices is locally carried out by the local voltage control apparatuses. Therefore, it is possible to perform voltage maintenance following even voltage fluctuation of the power distribution system due to a hard-to-predict factor, such as a change in the solar power generation amount. That is, it is possible to cope with sudden voltage fluctuation only with the local voltage control apparatuses without waiting for communication with the centralized voltage control apparatus 8. Therefore, it is possible to perform early voltage control.

In this embodiment, the communication between the centralized voltage control apparatus 8 and the local voltage control apparatuses only has to be performed every centralized control cycle, which is, for example, one hour. Therefore, compared with a case of, for example, transmitting a voltage command every local control cycle, a communication frequency is reduced and a communication load is not increased.

As explained above, according to this embodiment, it is possible to perform voltage maintenance following even voltage fluctuation of the power distribution system due to a hard-to-predict factor, such as a change in the solar power generation amount, without increasing a communication load. Note that as a method of determining the voltage upper and lower limit values in the centralized voltage control apparatus 8, the voltage upper and lower limit values can be determined by a method other than the method explained in this embodiment. Even in that case, the object can be attained as long as the centralized control by the centralized voltage control apparatus 8 and the local control by the local voltage control apparatuses are divided as described above. However, reliability of the voltage control of the power distribution system is improved by determining the voltage upper and lower limit values as in this embodiment.

According to this embodiment, the control target voltage range of the voltage control device is determined according to an optimization logic. Therefore, it is expected that the number of operations of the voltage control device is also optimized. Therefore, for the voltage control device of the transformer type, such as the LRT or the SVR, it is possible to reduce the number of times of switching of a tap. Consequently, it is possible to extend the life of the voltage control device.

On the other hand, the conventional centralized voltage control apparatus directly issues a command to the voltage control device setting a control amount of the voltage control device not via the local voltage control apparatus. Conventionally, control is carried out in response to detection of deviation of a voltage measurement value at the present point from a proper voltage range. However, in this embodiment, control is performed by predicting voltage fluctuation in a fixed period in the future and determining a control amount in advance such that a voltage does not deviate from a proper range in the fixed period. In the conventional local control apparatus, in general, voltage upper and lower limit values of the local control apparatus are determined offline and in a planning stage. Even when the voltage upper and lower limit values are changed according to a time change, the voltage upper and lower limit values are changed according to a power flow at its own end of the local control apparatus. Therefore, the determination of the voltage upper and lower limit values is intrinsically different from the method of determining the voltage upper and lower limit values in this embodiment.

Note that, in this embodiment, the prediction of loads/power generation amounts and the voltage upper and lower limit value command to the local voltage control apparatus are carried out, for example, every one hour. However, the prediction of loads/power generation amounts and the voltage upper and lower limit value commands to the local voltage control apparatus are not limited to this and can also be carried out, for example, every several tens of minutes (e.g., thirty minutes) to several hours or at longer time intervals. Further, the voltage upper and lower limit value commands to the local voltage control apparatus can also be carried out only when the voltage upper and lower limit command values greatly change. Consequently, a communication load is further reduced.

In preparation for inability of the local voltage control apparatus to receive the voltage upper and lower limit value commands every centralized control cycle from the centralized voltage control apparatus 8 due to a communication failure, it is also possible to transmit voltage upper and lower limit values for a large number of time slots (e.g., for the next one day) beforehand from the centralized voltage control apparatus 8 to the local voltage control apparatus and store the voltage upper and lower limit values in the local voltage control apparatus. In this case, when a communication abnormality occurs in a certain local voltage control apparatus, the local voltage control apparatus can operate based on the stored voltage upper and lower limit values. The centralized voltage control apparatus 8 can estimate the operation of the local voltage control apparatus. Note that, in this case, the processing at S102 in FIG. 3 is omitted.

INDUSTRIAL APPLICABILITY

As explained above, the present invention is useful as a power-distribution-system voltage control system, a power-distribution-system voltage control method, and a centralized voltage control apparatus.

REFERENCE SIGNS LIST 1, 5, 6 Voltage control devices
2 Bus
3-1, 3-2 Circuit breakers
4-1, 4-2 Distribution lines
7 Communication network
8 Centralized voltage control apparatus
9 Low-voltage system
10 Voltage and power flow measuring apparatus
11, 15, 16 Local voltage control apparatuses
20 Control unit
21 Load-and-power-generation-amount predicting unit
22 Load-and-power-generation-amount-predicted-values correcting unit
23 Optimum-voltage-distribution determining unit
24 Voltage-upper-and-lower-limit-values determining unit
28 Transmitting and receiving unit
29 Storing unit
56 Transformer
57 Load
58 Solar power generation apparatus

The invention claimed is:

1. A power-distribution-system voltage control system comprising:
   a distribution line of a high-voltage system from which a power distribution system of the high-voltage system is configured and to which a low-voltage system including a distributed power supply is connected;
   a plurality of voltage control devices connected to the distribution line and configured to control a voltage of the distribution line;
   local voltage control apparatuses connected to the voltage control devices, respectively, and configured to adjust a control amount of the voltage control devices every second cycle, such that a voltage value controlled by the voltage control devices is maintained within a range of a voltage upper limit value and a voltage lower limit value; and
   a centralized voltage control apparatus including:
     a load-and-power-generation-amount predicting unit configured to predict, every first cycle, a load and power generation amount distribution, which represents a difference between a pure load and a power generation amount at each point of the power generation system;
     an optimum-voltage-distribution determining unit configured to determine the optimum voltage distribution in the first cycle period by performing a power flow calculation based on the load and power generation amount distribution predicted by the load-and-power-generation-amount predicting unit and by performing a search for a best solution to optimize a value of an evaluation function set for an evaluation item of the power distribution system; and
     a voltage-upper-and-lower-limit-values determining unit, with respect to each of the local voltage control apparatuses, configured to:
       select a minimum voltage-upper-limit margin amount out of voltage-upper-limit margin amounts, which are differences between optimum voltages obtained from the optimum voltage distribution within a voltage control responsible range, which is a range on the distribution line for which each of the local voltage control apparatuses is responsible in voltage control, and an upper limit value in a proper voltage range set in advance for the voltage responsible range;
       select a minimum voltage-lower-limit margin amount out of voltage-lower-limit margin amounts, which are differences between the optimum voltages and a lower limit value in the proper voltage range in the voltage control responsible range;
       determine, as the voltage upper limit value, a value obtained by adding the voltage-upper-limit margin amount to the optimum voltage of a voltage control device that is a control target of the local voltage control apparatus;
       determine, as the voltage lower limit value, a value obtained by subtracting the voltage-lower-limit margin amount from the optimum voltage of the voltage control device; and
       issue, via the communication network, a command to each of the local voltage control apparatuses setting the voltage upper limit value and the voltage lower limit value.

2. The power-distribution-system voltage control system according to claim 1, wherein the voltage-upper-and-lower-limit-values determining unit determines, with respect to each of the local voltage control apparatuses, the voltage upper limit value and the voltage lower limit value every first cycle and transmits the voltage upper limit value and the voltage lower limit value to each of the local voltage control apparatuses every first cycle.

3. The power-distribution-system voltage control system according to claim 2, further comprising a plurality of voltage and power flow measuring apparatuses that are each connected to the distribution line and are each connected to the centralized voltage control apparatus via the communication network and that each measure a voltage and a power flow of the distribution line and periodically transmit measurement information to the centralized voltage control apparatus, wherein
the load-and-power-generation-amount predicting unit predicts the load and power generation amount distribution based on the measurement information transmitted from the voltage and power flow measuring apparatuses.

4. The power-distribution-system voltage control system according to claim 3, wherein:
the centralized voltage control apparatus includes a load-and-power-generation-amount-predicted-values correcting unit configured to correct a predicted value of a load and power generation amount distribution in a current first cycle period based on a ratio of an actual value of a load and power generation amount distribution calculated based on the measurement information in a previous first cycle period immediately before the current first cycle period, and a predicted value in the period, and
the optimum-voltage-distribution determining unit determines the optimum voltage distribution based on a predicted value of a load and power generation amount distribution corrected by the load-and-power-generation-amount-predicted-values correcting unit.

5. The power-distribution-system voltage control system according to claim 2, wherein, when the voltage control device connected to the local voltage control apparatus is a transformer type, the voltage control responsible range is a range on the distribution line on a downstream side of the voltage control device and is a range before a next voltage control device appears on the distribution line.

6. The power-distribution-system voltage control system according to claim 2, wherein, when the voltage control device connected to the local voltage control apparatus is a reactive power control type and a voltage control device of a transformer type is present on an upstream side of the voltage control device, the voltage control responsible range includes a range that is on the distribution line on an upstream side of the voltage control device and is before the voltage control device of the transformer type appears, and a range that is on the distribution line on a downstream side of the voltage control device and is before a next voltage control apparatus appears on the distribution line.

7. The power-distribution-system voltage control system according to claim 2, wherein the first cycle is variable.

8. A centralized voltage control apparatus that is connected, via a communication network, to each of local voltage control apparatuses of a power distribution system that includes:
a distribution line of a high-voltage system from which the power distribution system of the high-voltage system is configured and to which a low-voltage system including a distributed power supply is connected;
a plurality of voltage control devices connected to the distribution line and configured to control a voltage of the distribution line; and
the local voltage control apparatuses connected to the voltage control devices, respectively, and configured to adjust a control amount of the voltage control devices every second cycle, such that a voltage value controlled by the voltage control devices is maintained within a range of a voltage upper limit value and a voltage lower limit value,
the apparatus including:
a load-and-power-generation-amount predicting unit that predicts, every first cycle, a load and power generation amount distribution based on a pure load and a power generation amount of the system;
an optimum-voltage-distribution determining unit that determines an optimum voltage distribution in the first cycle period by performing a power flow calculation based on the load and power generation amount distribution predicted by the load-and-power-generation-amount predicting unit and by performing a search for a best solution to optimize a value of an evaluation function set for an evaluation item of the power distribution system; and
a voltage-upper-and-lower-limit-values determining unit configured to:
select a minimum voltage-upper-limit margin amount out of voltage-upper-limit margin amounts, which are differences between optimum voltages obtained from the optimum voltage distribution within a voltage control responsible range, which is a range on the distribution line for which each of the local voltage control apparatuses is responsible in voltage control, and an upper limit value in a proper voltage range set in advance for the voltage responsible range;
select a minimum voltage-lower-limit margin amount out of voltage-lower-limit margin amounts, which are differences between the optimum voltages and a lower limit value in the proper voltage range in the voltage control responsible range;
determine, as the voltage upper limit value, a value obtained by adding the voltage-upper-limit margin amount to the optimum voltage of a voltage control device that is a control target of the local voltage control apparatus;
determine, as the voltage lower limit value, a value obtained by subtracting the voltage-lower-limit margin amount from the optimum voltage of the voltage control device; and
issue, via the communication network, a command to each of the local voltage control apparatuses for setting the voltage upper limit value and the voltage lower limit value.

9. A local voltage control apparatus:
connected to a voltage control device that is connected to a distribution line of a high-voltage system, from which a power distribution system of the high-voltage system is configured and to which a low-voltage system including a distributed power supply is connected, and controls a voltage of the distribution line, and
connected, via a communication network, to a centralized voltage control apparatus including:
a load-and-power-generation-amount predicting unit configured to predict, every first cycle, a load and power generation amount distribution, which represents a difference between the pure load and a power generation amount at each point of the power generation system;
an optimum-voltage-distribution determining unit configured to determine the optimum voltage distribution in the first cycle period by performing a power flow calculation based on the load and power generation amount distribution predicted by the load-and-power-generation-amount predicting unit and by performing a search for a best solution to optimize a value of an evaluation function set for an evaluation item of the power distribution system; and a voltage-upper-and-lower-limit-values determining unit, with respect to each of the local voltage control apparatuses, configured to:

select a minimum voltage-upper-limit margin amount out of voltage-upper-limit margin amounts, which are differences between optimum voltages obtained from the optimum voltage distribution within a voltage control responsible range, which is a range on the distribution line for which each of the local voltage control apparatuses is responsible in voltage control, and an upper limit value in a proper voltage range set in advance for the voltage responsible range;

select a minimum voltage-lower-limit margin amount out of voltage-lower-limit margin amounts, which are differences between the optimum voltages and a lower limit value in the proper voltage range in the voltage control responsible range;

determine, as the voltage upper limit value, a value obtained by adding the voltage-upper-limit margin amount to the optimum voltage of a voltage control device that is a control target of the local voltage control apparatus;

determine, as the voltage lower limit value, a value obtained by subtracting the voltage-lower-limit margin amount from the optimum voltage of the voltage control device; and issue, via the communication network, a command to each of the local voltage control apparatuses setting the voltage upper limit value and the voltage lower limit value, wherein:

the local voltage control apparatus adjusts a control amount of the voltage control device every second cycle, which is shorter than the first cycle, such that a voltage value controlled by the local voltage control device is maintained within a range of the voltage upper limit value and the voltage lower limit value that are updated every first cycle based on the command issued by the centralized voltage control apparatus, wherein the voltage upper and lower limit values are determined based on voltage limit margins computed using optimum voltages in the optimum voltage distribution.

10. A distribution grid system control system comprising:

a plurality of voltage control devices that are connected to different locations of a power distribution grid, each of which controls a voltage at the location connected thereto;

a local voltage control apparatus that controls, during a second cycle, at least one of the plurality of voltage control devices as a control target so that the voltage controlled by the control target is kept within a range between a first voltage upper limit and a second voltage lower limit; and a centralized voltage control apparatus that issues, during a first cycle, a command to change the range between the first voltage upper limit and the second voltage lower limit to the local voltage control apparatus based on a third voltage upper limit, a fourth voltage lower limit and flow data of the power distribution grid, so that respective voltages at the different locations fall within a range between the third voltage upper limit and the fourth voltage lower limit, the centralized voltage control apparatus including:

a load-and-power-generation-amount predicting unit configured to predict, every first cycle, a load and a power generation amount distribution, which represents a difference between the pure load and the load and power generation amount at each point of the power generation system;

an optimum-voltage-distribution determining unit configured to determine the optimum voltage distribution in the first cycle period by performing a power flow calculation based on the load and power generation amount distribution predicted by the load-and-power-generation-amount predicting unit and by performing a search for a best solution to optimize a value of an evaluation function set for an evaluation item of the power distribution system; and a voltage-upper-and-lower-limit-values determining unit, with respect to each of the local voltage control apparatuses, configured to:

select a minimum voltage-upper-limit margin amount out of voltage-upper-limit margin amounts, which are differences between optimum voltages obtained from the optimum voltage distribution within a voltage control responsible range, which is a range on the distribution line for which each of the local voltage control apparatuses is responsible in voltage control, and an upper limit value in a proper voltage range set in advance for the voltage responsible range;

select a minimum voltage-lower-limit margin amount out of voltage-lower-limit margin amounts, which are differences between the optimum voltages and a lower limit value in the proper voltage range in the voltage control responsible range;

determine, as the voltage upper limit value, a value obtained by adding the voltage-upper-limit margin amount to the optimum voltage of a voltage control device that is a control target of the local voltage control apparatus;

determine, as the voltage lower limit value, a value obtained by subtracting the voltage-lower-limit margin amount from the optimum voltage of the voltage control device; and issue, via the communication network, a command to each of the local voltage control apparatuses setting the voltage upper limit value and the voltage lower limit value, wherein the second cycle is shorter than the first cycle.

* * * * *